(12) United States Patent
Cai (10) Patent No.: US 11,502,554 B2
(45) Date of Patent: Nov. 15, 2022

(54) METHODS AND APPARATUS FOR ONLINE FOREIGN OBJECT DETECTION IN WIRELESS CHARGING SYSTEMS

(71) Applicant: Wen Cai, Santa Clara, CA (US)

(72) Inventor: Wen Cai, Santa Clara, CA (US)

( * ) Notice: Subject to any disclaimer, the term of this patent is extended or adjusted under 35 U.S.C. 154(b) by 357 days.

(21) Appl. No.: 16/751,015

(22) Filed: Jan. 23, 2020

(65) Prior Publication Data

US 2021/0234411 A1   Jul. 29, 2021

(51) Int. Cl.
*H02J 7/00* (2006.01)
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
USPC .......................... 320/106, 107, 108, 109, 110
See application file for complete search history.

(56) References Cited

U.S. PATENT DOCUMENTS

| | | |
|---|---|---|
| 9,474,031 B1 | 10/2016 | Sedzin et al. |
| 9,553,485 B2 | 1/2017 | Singh et al. |
| 9,762,092 B2 | 9/2017 | Jung et al. |
| 9,837,848 B2 | 12/2017 | Fisher-Jeffes et al. |
| 9,997,961 B2 | 6/2018 | Kanno et al. |
| 10,027,183 B2 | 7/2018 | Miyamoto et al. |
| 10,063,110 B2 | 8/2018 | Meichle |
| 10,110,066 B2 | 10/2018 | Wantanabe et al. |
| 10,236,725 B1 | 3/2019 | Shahsavari et al. |
| 2013/0163635 A1 | 6/2013 | Karanth et al. |
| 2014/0232199 A1 | 8/2014 | Jung et al. |
| 2015/0357825 A1* | 12/2015 | Wortel ..................... H02J 7/025 307/104 |

(Continued)

FOREIGN PATENT DOCUMENTS

| | | | | |
|---|---|---|---|---|
| CN | 105449875 A | * | 3/2016 | ............... G05F 1/66 |
| JP | 2013132133 A | * | 7/2013 | ............. G01R 15/18 |
| WO | WO 2019/229750 A1 | | 12/2019 | |

OTHER PUBLICATIONS

International Search Report, dated Jun. 15, 2021, for corresponding International Application No. PCT/US2021/014792, pp. 1-2.

(Continued)

*Primary Examiner* — Brian Ngo
(74) *Attorney, Agent, or Firm* — Intelllectual Property Law Group LLP (57) ABSTRACT

Methods and apparatus for online foreign object detection for use with wireless charging systems. In an embodiment, an apparatus is provided that comprises a resonant circuit having a foreign object detection (FOD) coil that is energized by an online power transfer coil. The resonant circuit outputs a time-decaying resonate signal that indicates whether or not a foreign object is present. The apparatus also comprises a determination circuit that determines a decay time from the time-decaying resonate signal, and a detector circuit that outputs a detection signal having a first state when the decay time is greater than a threshold value to indicate that a foreign object is not present. The detector circuit also outputs the detection signal having a second state when the decay time is not greater than the threshold value to indicate that a foreign object is present.

18 Claims, 8 Drawing Sheets

(56) References Cited

U.S. PATENT DOCUMENTS

| | | |
|---|---|---|
| 2016/0020642 A1 | 1/2016 | Liu et al. |
| 2016/0352151 A1 | 12/2016 | Standke et al. |
| 2017/0054333 A1 | 2/2017 | Roehrl et al. |
| 2018/0109152 A1 | 4/2018 | Chen |
| 2018/0191203 A1 | 7/2018 | Cha et al. |
| 2018/0191204 A1 | 7/2018 | Cha et al. |
| 2018/0219421 A1 | 8/2018 | Yang et al. |
| 2018/0323659 A1 | 11/2018 | Maniktala |
| 2019/0074730 A1 | 3/2019 | Shahsavari et al. |
| 2019/0081516 A1 | 3/2019 | Shahsavari et al. |
| 2019/0165618 A1 | 5/2019 | Chen et al. |
| 2019/0181692 A1 | 6/2019 | Chen et al. |
| 2019/0363588 A1* | 11/2019 | Daetwyler ............. H02J 50/90 |
| 2020/0381960 A1* | 12/2020 | Goodchild ........... H04B 5/0075 |
| 2021/0028655 A1* | 1/2021 | Goodchild ............. H02J 50/90 |
| 2021/0234411 A1* | 7/2021 | Cai ........................ H02J 50/60 |

OTHER PUBLICATIONS

Written Opinion of the International Searching Authority, dated Jun. 15, 2021, for corresponding International Application No. PCT/US2021/014792, pp. 1-6.

* cited by examiner

FIG. 4
NO OBJECT DETECTED

FIG. 5
OBJECT DETECTED

FIG. 8
ONLINE FOREIGN OBJECT DETECTION

METHODS AND APPARATUS FOR ONLINE FOREIGN OBJECT DETECTION IN WIRELESS CHARGING SYSTEMS

FIELD

The exemplary embodiments of the present invention relate to the design and operation of wireless charging systems, and more specifically, to the online detection of foreign objects for use with wireless charging systems.

BACKGROUND

With the rapidly growing trend of mobile and battery powered devices, the ability to quickly and conveniently charge these devices has become increasingly important. One way to charge battery powered devices is through wireless charging. Wireless charging is based on magnetic resonant coupling where electricity is transmitted through the air by creating a magnetic field between two circuits, a transmitter, and a receiver. Currently, there are several wireless charging technologies available that are used to charge a variety of devices, from smartphone to automobiles.

One issue to be addressed by wireless charging systems is that of foreign object detection. For example, foreign objects between the transmitter and receiver may degrade charging performance or may cause over temperature and potential damage of both transmitter and receiver. Thus, foreign object detection has become an important function for wireless charging systems.

However, current foreign object detection systems operate in an off-line mode where foreign object detection is only performed before wireless charging is initiated. Also, typical systems utilizes digital microcontrollers and corresponding software for foreign object detection. This results in foreign object detection being performed as an off-line process that may have slow detection speed, high complexity, high cost, and the need for digital processors and associated memory.

Thus, it is desirable to have an online foreign objection detection system for use with wireless charging systems that overcomes the problems of conventional systems.

SUMMARY

In various exemplary embodiments, methods and apparatus are provided for online foreign object detection in wireless charging systems. In an embodiment, fast online foreign object detection is achieved by adding extra coils and corresponding circuitry in the wireless charging system. The system is implemented using only analog circuitry, which is cheaper than complex and expensive digital processing system implementations. In an embodiment, a detection coil is placed between a transmitter coil and a receiver coil. The detection coil is constructed with only windings and does not need a ferrite core. The detection coil is energized by the operation of the transmitter coil via the generated magnetic field, and the response of the detection coil is captured to determine the detection coil's quality factor. In various embodiments, the quality factor is represented as a time-delay, voltage, or current. When a foreign object is present, the quality factor of the detection coil will be reduced. By comparing the quality factor of the detection coil to a threshold value, foreign objects can be accurately detected during online charging operation.

In exemplary embodiments, even though described herein for use with "wireless charging systems," various embodiments are suitable for use in "wireless power systems." When there is battery on receiver side, this configuration can be referred to as a "wireless charging system," however, embodiments can be referred to as "wireless power systems" whether or not there is battery on the secondary side.

In an embodiment, an apparatus is provided that comprises a foreign object detection (FOD) coil that is energized by an online transmitter coil and that outputs a time-decaying resonate signal that indicates whether or not a foreign object is present. For example, when a foreign object is present the detection coil is demagnetized via a circuit. The apparatus also includes a determination circuit that determines a decay time of the time-decaying resonate signal, and a detector circuit that outputs a detection signal to indicate that an object is not present if the decay time is greater than a threshold value, and outputs no detection signal to indicate that the object is present if the decay time is not greater than the threshold value. In an embodiment, the determination circuit and detector circuit are provided separately. In another embodiment, the determination circuit and detector circuit may be integrated into the transmitter circuit or the receiver circuit.

In an embodiment, an apparatus is provided that comprises a resonant circuit having a foreign object detection (FOD) coil that is energized by an online power transfer coil. The resonant circuit outputs a time-decaying resonate signal that indicates whether or not a foreign object is present. The apparatus also comprises a determination circuit that determines a decay time from the time-decaying resonate signal, and a detector circuit that outputs a detection signal having a first state when the decay time is greater than a threshold value to indicate that a foreign object is not present. The detector circuit also outputs the detection signal having a second state when the decay time is not greater than the threshold value to indicate that a foreign object is present.

In an embodiment, a method is provided that comprises energizing a foreign object detection (FOD) coil with energy from an online power transfer coil to generate a time-decaying resonate signal (Vc), and converting a decay time TD of the resonate signal Vc to a voltage (Vcp). The method also comprises comparing the voltage (Vcp) to a threshold value (REF), and outputting a detection signal having a first state when the voltage (Vcp) is greater than the threshold value (REF) to indicate that a foreign object is not present. The method also comprises outputting the detection signal having a second state when the voltage (Vcp) is not greater than the threshold value (REF) to indicate that a foreign object is present.

In an embodiment, an apparatus is provided that comprises a foreign object detection (FOD) coil that is energized by an online power transfer coil, and an auxiliary circuit connected to the FOD coil. The auxiliary circuit generates a time-decaying resonate signal having a decay time and outputs a detection signal indicating that a foreign object is present when the decay time is not greater than a threshold value.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

Figure 1:
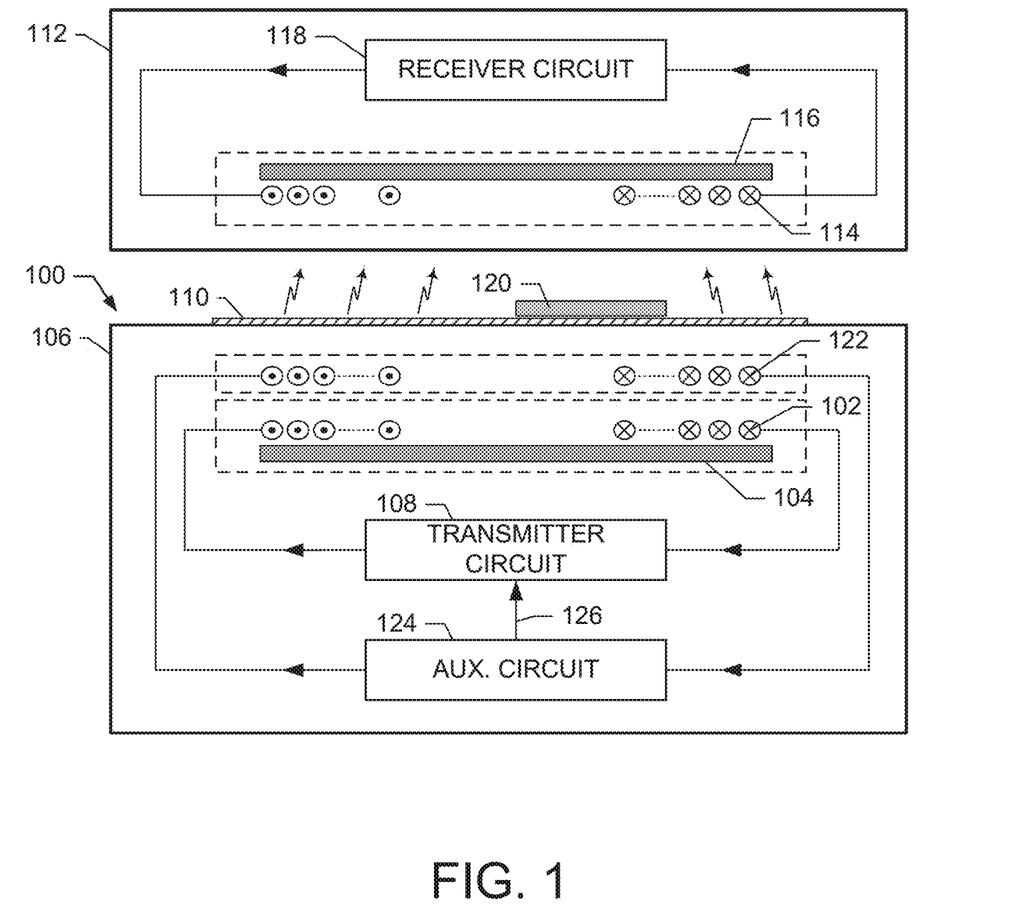
FIG. 1 shows a wireless charging device that includes an exemplary embodiment of a foreign object detector.

FIG. 1 shows a wireless charging device 100 that includes an exemplary embodiment of an online foreign object detector. The wireless charging device 100 comprises a power transfer coil (or transmitter coil) which usually includes winding 102 and ferrite core 104 that are mounted in a housing 106. The ferrite core 104 and the housing 106 are optional. The winding 102 and ferrite core 104 are connected to a transmitter circuit 108. The housing 106 includes a power transfer surface 110, which is optional. A receiving device 112 includes a power receiving coil which includes windings 114 and an optional ferrite core 116 that are connected to a receiving circuit 118. During power transfer, the receiving device 112 is placed on the power transfer surface 110 and the transmitter circuit 108 energizes the power transfer coil 102 to transfer power to the power receiving coil 114.

The power transfer may be interrupted or degraded if a foreign object comes between the power transfer device and the receiving device. For example, the object 120 is shown on the power transfer surface 110. The object may be a coin or other object that may interrupt, degrade, or prevent power transfer.

In an exemplary embodiment, a foreign object detector is provided to detect the presence of foreign objects between the transmitting device and the receiving device. The foreign object detector comprises a foreign object detecting (FOD) coil 122 and an auxiliary circuit 124. Various configurations of the foreign object detecting FOD coil 122 and the auxiliary circuit 124 are possible. For example, in one configuration, both of the FOD coil 122 and the auxiliary circuit 124 are located within the housing 106. In other configurations, one or both of the FOD coil 122 and the auxiliary circuit 124 are located outside the housing 106. In still another configuration, one or both of the FOD coil 122 and the auxiliary circuit 124 are located within the receiver housing 112.

In an embodiment, the FOD coil 122 is placed between the transmitter coil 102 and receiver coil 114. The FOD coil 122 is constructed with only a winding and does not need a ferrite core. The FOD coil 122 is energized by the operation of the transmitter coil 102 via a magnetic field that is generated by the transmitter coil 102, and the response of the FOD coil 122 is captured so that the FOD coil's quality factor can be determined. Thus, the power source of the FOD coil 122 is the magnetic field generated by the transmitter coil 102. The system operates "online" because the FOD coil 122 is excited when the transmitter is energized. When the transmitter coil 102 is excited by the transmitter circuit 108, a magnetic field is generated in the space between transmitter coil and receiver coil. Due to the FOD coil being placed in the magnetic field, the FOD coil is energized by the magnetic field. When a foreign object is not present between the coils, the quality factor of the FOD coil 122 is kept at a large value. When a foreign object is present between the coils, the quality factor of the FOD coil 122 will be reduced. By comparing the quality factor of the FOD coil 122 to a threshold value, foreign objects can be detected. When a foreign object is detected, a detection signal 126 is provided from the auxiliary circuit 124 to the transmitter circuit 108. A more detailed description of the foreign object detector is provided below.

Figure 2:
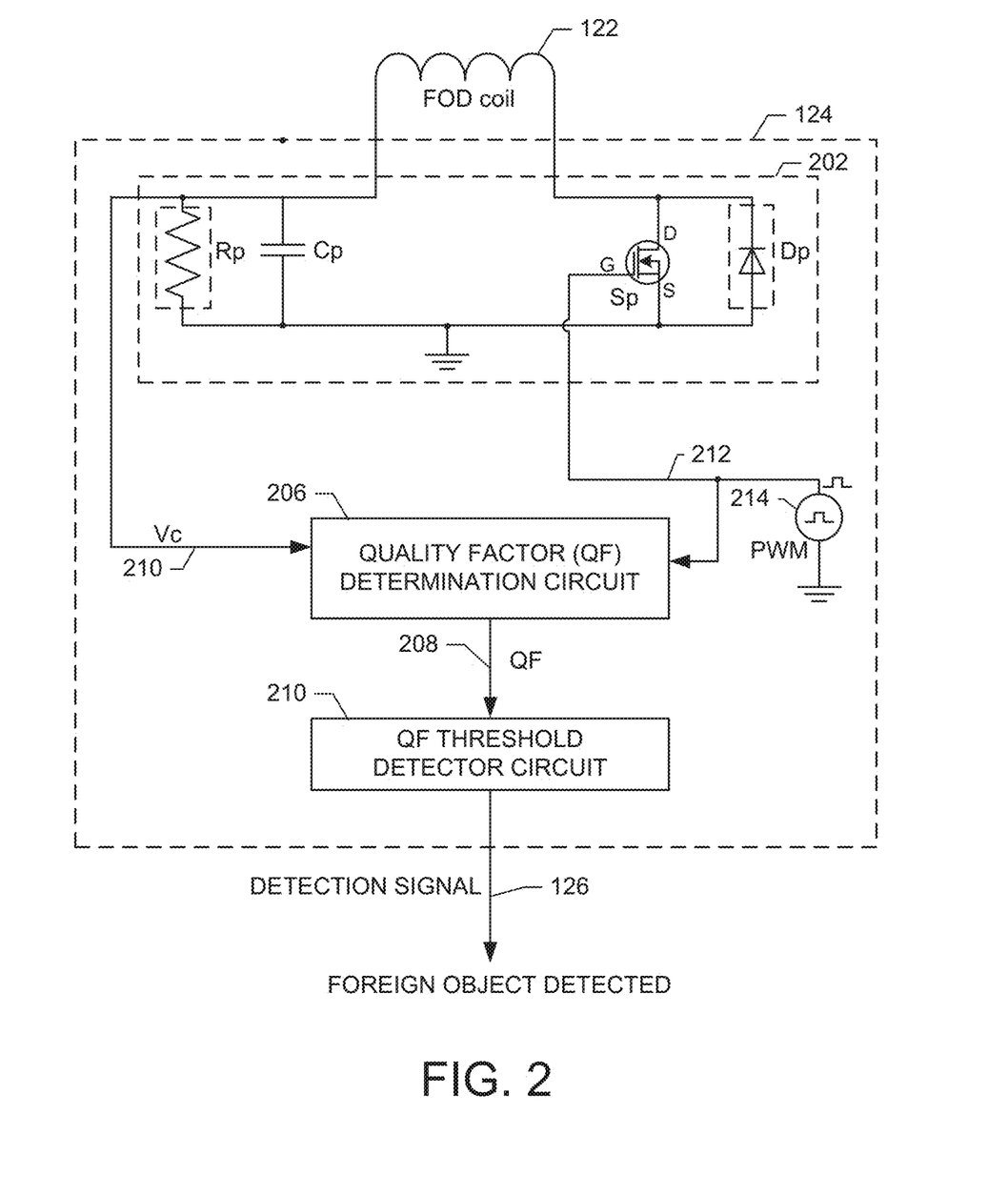
FIG. 2 shows an exemplary detailed embodiment of a FOD coil and an auxiliary circuit shown in FIG. 1.

FIG. 2 shows an exemplary detailed embodiment of the FOD coil 122 and the auxiliary circuit 124 shown in FIG. 1. In an embodiment, the FOD coil 122 is connected to a resonant circuit 202. The resonant circuit comprises a power switch (Sp) and a capacitor (Cp). The switch Sp can be a semiconductor device, like a MOSFET, IGBT, SCR, solid-state breaker, BiT, or mechanical device like relay or breaker. A diode (Dp) is in parallel across the switch Sp, but the diode is optional because some switches have a body diode integrated. The performance of a body diode in a switch may not be as good as separate diode, so a separate diode can help improve system efficiency. An optional resistor Rp can be coupled in parallel with the capacitor (Cp) to reduce the peak voltage of the capacitor. In some applications, the peak voltage of the capacitor is not too large so that the resistor Rp can be omitted. A measurement cycle of the resonant circuit 202 is started by a pulse width modulated (PWM) signal 212 that drives the switch Sp. In an embodiment, the PWM signal source 214 generates the PWM signal 212. For example, a measurement time interval is defined when the PWM signal 212 is in a high state, and an idle time interval is defined when the PWM signal 212 is in a low state. During operation, a capacitor voltage signal (Vc) 204 is sensed. For example, the signal Vc 204 may be a time-decaying resonate signal.

In an embodiment, the capacitor voltage Vc 204 is sensed by a quality factor (QF) determination circuit 206 that determines the FOD coil's quality factor 208 according to the degrading speed of the time-decaying voltage Vc 204. In an embodiment, the QF determination circuit 206 utilizes the PWM signal 212 and transfers the quality factor to an analog signal. A quality factor threshold circuit 210 receives the analog signal representing the determined QF 208 and compares this signal with a threshold signal. If the quality factor 208 is lower than the threshold, a foreign object has been detected and the output detection signal 126 is kept low, which represents a first state of the detection signal 126. Otherwise, when there are no foreign objects between transmitter coil and receiver coil a pulse on the detection signal 126 is generated, which represents a second state of the detection signal 126.

Figure 3A:
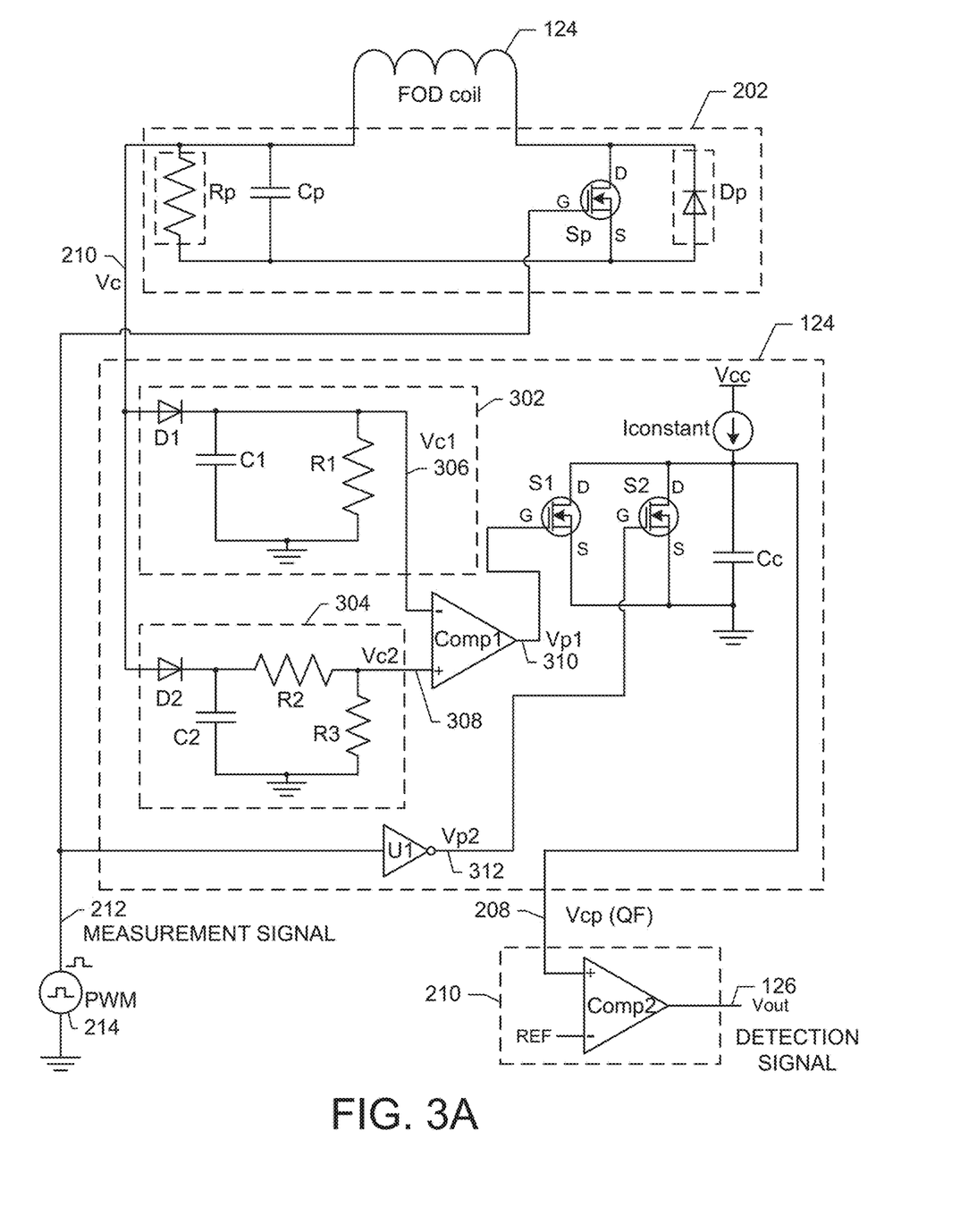
FIG. 3A shows an exemplary detailed embodiment of the auxiliary circuit shown in FIG. 2.

FIG. 3A shows an exemplary detailed embodiment of the auxiliary circuit 124 shown in FIG. 2. The capacitor voltage (Vc) 210 is connected to two rectifier circuits 302 and 304. The first rectifier circuit 302 comprises a diode (D1), a capacitor (C1), and resistor (R1). In an embodiment, the capacitor voltage alternates and the first rectifier circuit 302 is used to capture the time-decaying amplitude of capacitor voltage.

Figure 3B:
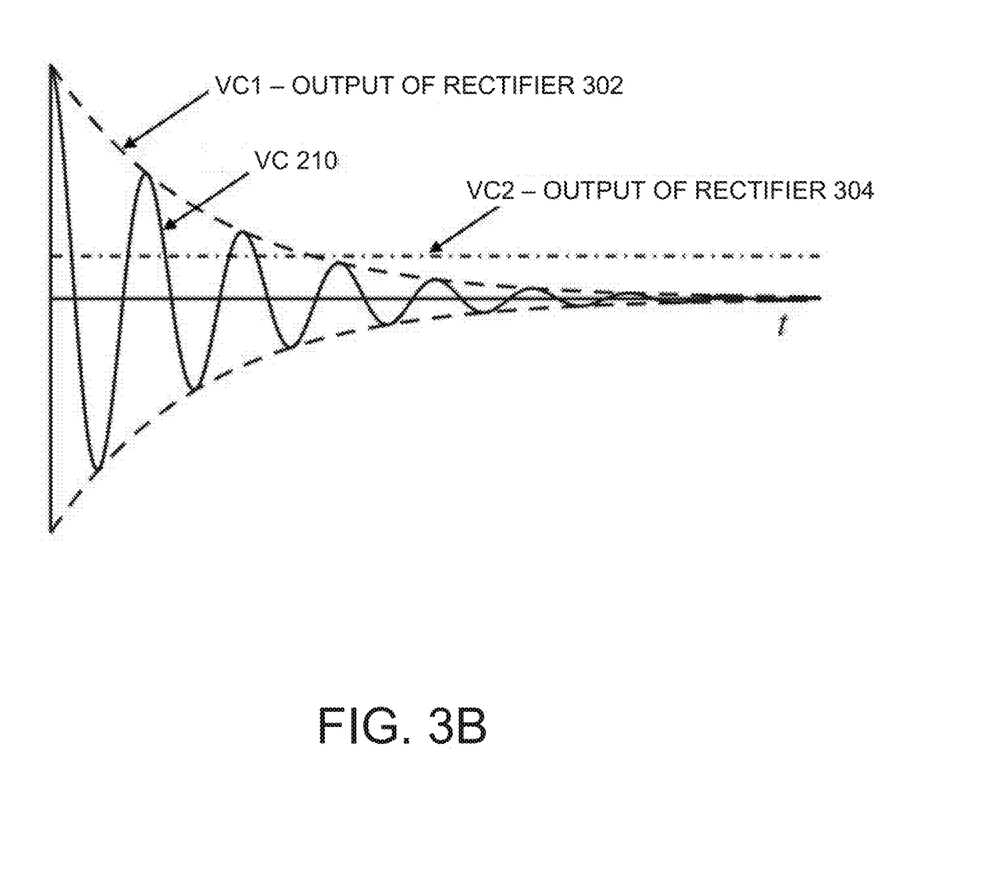
FIG. 3B shows a relationship between a capacitor voltage Vc and outputs of first and second rectifier circuits of the auxiliary circuit shown in FIG. 3A.

FIG. 3B shows the relationship between the capacitor voltage Vc 210 and the output of the first 302 and second 304 rectifier circuits shown in FIG. 3A. As illustrated in FIG. 3B, the capacitor voltage Vc 210 is a time-decaying resonant signal. The output Vc1 of the first rectifier circuit 302 follows the envelope of the time-decaying resonant signal Vc. The output Vc2 of the second rectifier circuit 304 maintains a relatively constant value.

Referring again to FIG. 3A, the selection of resistor and capacitor values is based on the desired time-decaying speed. The second rectifier circuit 304 comprises a diode D2, a capacitor C2 and two resistors (R2 and R3), which is used to set the threshold and evaluate the time-decaying speed of the capacitor voltage. Typically, the capacitor and sum of resistors in the second rectifier circuit 304 are much larger than the capacitor and resistor in first rectifier circuit 302, respectively. For example, in an embodiment, the capacitor values are (2.2 nF) and the resistor values are (1 kohm).

A first comparator (Comp1) receives the output voltages Vc1 306 and Vc2 308 of two rectifier circuits as inputs and generates a comparator output (Vp1) 310 that is connected to a switch (S1). Two switches (S1 and S2) are in parallel with a charge capacitor (Cc). The capacitor Cc is charged by a current source (Iconstant) if S1 and S2 are both turned off. The voltage Vcp 208 of the charge capacitor (Cc) indicates the value of QF and acts as one input to a second comparator (Comp2). A second input to the comparator Comp2 is connected to a constant reference voltage (REF). The output of Comp2 is Vout 126 and is used to identify whether or not a foreign object has been detected. The switch S2 is driven by the inverted PWM signal 212 that is generated by the logic inverter U1.

Figure 4:
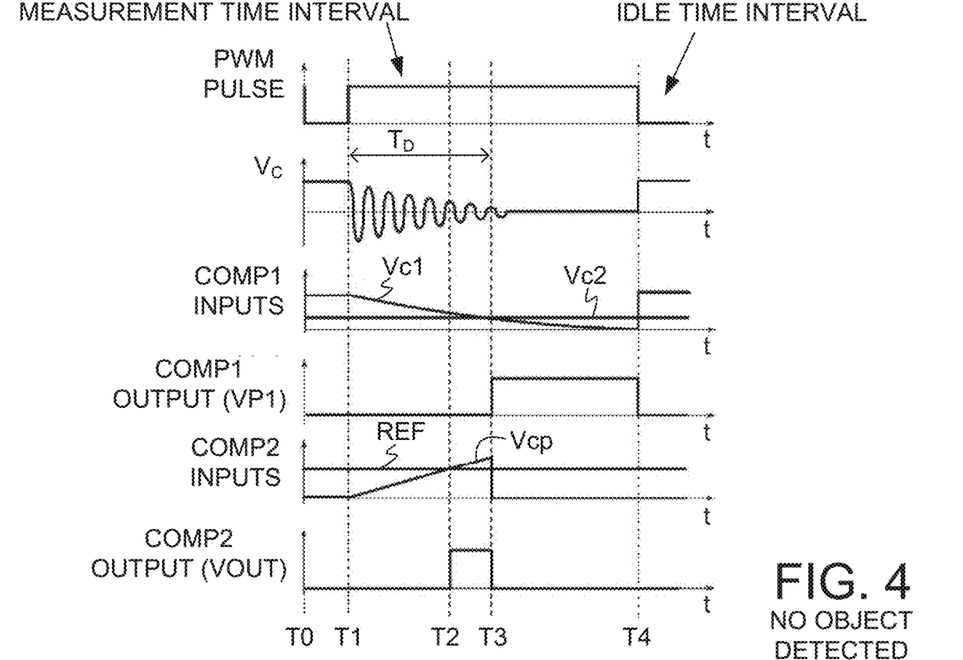
FIG. 4 shows exemplary timing diagrams that illustrate the operation of an embodiment of the foreign object detector shown in FIG. 2 when no foreign object is detected.

FIG. 4 shows exemplary timing diagrams that illustrate the operation of an embodiment of the foreign object detector shown in FIG. 2. For example, the timing diagrams shown in FIG. 4 illustrate operation when a foreign object is not detected.

Between times T0 and T1, the PWM pulse signal generated by the PWM source 214 is low (idle time interval), and the capacitor voltage Vc 210 is high. The rectified voltage Vc1 306 equals the amplitude of capacitor voltage Vc 210. The rectified voltage Vc2 308 equals a percentage of the amplitude of the capacitor voltage Vc 210 because of the resistor divider network (R2 and R3) on the Vc2 path. Since Vc1 306 is higher than Vc2 308, the output VP1 310 of the comparator (Comp1) is low and switch S1 is turned off. At the same time, the output Vp2 312 of the invertor U1 is high, so that the switch S2 is turned on and the capacitor Cc is discharged completely to 0V.

Between times T1 to T2, the PWM pulse signal 212 becomes high (measurement time interval), the capacitor (Cp) and the FOD coil 124 start resonant, so the capacitor voltage Vc 210 alternates and its amplitude drops (decays) slowly. At T1, the power switch Sp is turned on by high level of the PWM pulse 212 so that the capacitor (Cp) and FOD coil, which forms an LC circuit, cause the Vc signal to oscillate with the self-resonate frequency. The amplitude of the capacitor voltage (Vc) decreases continuously, because the FOD coil's equivalent resistance causes damping for the LC resonance circuit.

Figure 5:
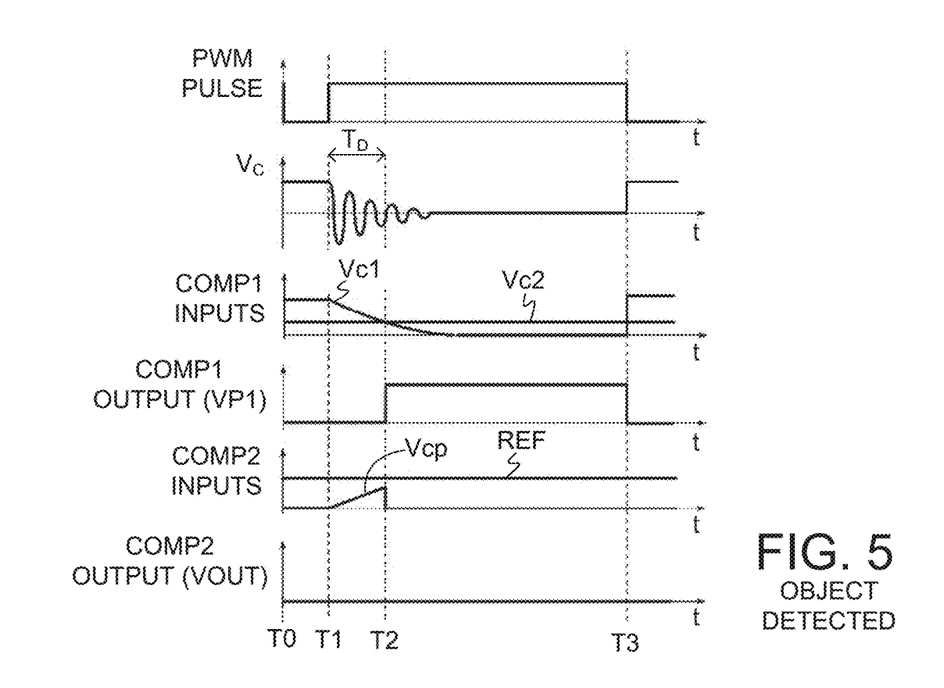
FIG. 5 shows exemplary timing diagrams that illustrate the operation of an embodiment of the foreign object detector shown in FIG. 2 when a foreign object is detected.

The FOD coil's equivalent resistance increases which extends a drop off time ($T_D$) of the Vc signal 210. The FOD coil's equivalent resistance also represents the value of a quality factor. When no foreign object is present or detected, the FOD coil has a lower equivalent resistance, which extends the drop off time $T_D$. When a foreign object is detected, the FOD coil has a higher equivalent resistance, which reduces the drop off time $T_D$, as illustrated in FIG. 5. By monitoring the speed of the Vc drop off time, the quality factor of the FOD coil can be obtained and then a determination of foreign object detection can be made.

The rectified voltage Vc2 keeps constant because the capacitor C2 used in the corresponding rectified circuit is large. At the same time, the rectified voltage Vc1 starts reducing with the same rate of capacitor voltage Vc, because the capacitor C1 used in this rectified circuit is small. Because Vc1 starts from Vc, while Vc2 is only a percentage of Vc, the signal Vc1 is higher than Vc2, so that the output Vp1 of the comparator Comp1 stays low and the switch S1 remains turned off. Since the PWM pulse signal is high, its inverted signal Vp2 is low, which turns off the switch S2. During this time, the constant current source (Iconstant) charges the capacitor Cc and the capacitor voltage (Vcp) increases.

At time T2, the capacitor voltage Vcp has increased until Vcp is higher than the reference voltage REF. When this happens, the output Vout of the comparator (Comp2) becomes high (e.g., first state of detection signal).

Between times T2 and T3, the voltage Vc1 keeps decreasing until it becomes 0 volts and Vc2 maintains a constant voltage.

Between times T3 and T4, the signal Vc1 becomes lower than Vc2. During this time, the output Vp1 of the comparator (Comp 1) switches to high and the switch (S1) is turned on. When S1 is turned on, the charge capacitor (Cc) is discharged and its voltage Vcp becomes 0, which is lower than REF. The output Vout of the comparator (Comp2) becomes low.

At time T4, the PWM pulse signal switches to low, then the power switch (Sp) is turned off and the resonant circuit (Cp and FOD coil) is cut off. The capacitor voltage (Vc)

increases to a high voltage. At the same time, the switch (S2) is turned on and the charge capacitor voltage (Vcp) keeps at 0. The circuit operation is the same as at time T0 and one cycle is completed. Thus, when a foreign object is not detected, the output generates a pulse for each cycle.

FIG. 5 shows exemplary timing diagrams that illustrate the operation of an embodiment of the foreign object detector shown in FIG. 2. For example, the timing diagrams shown in FIG. 5 illustrate operation when a foreign object is detected.

Between times T0 and T1, the PWM pulse signal 212 is low, the capacitor voltage Vc is high. The rectified voltage Vc1 306 equals Vc 210. The rectified voltage Vc2 308 equals a percentage of Vc 210 because of the resistor divider on the Vc2 path. Since Vc1 is higher than Vc2, the output Vp1 310 of the comparator (Comp 1) is low. At the same time, the output Vp2 312 of the invertor U1 is high, so the switch S2 is turned on and the charge capacitor (Cc) is discharged to 0.

Between times T1 to T2, the PWM pulse signal becomes high, the capacitor (Cp) and the FOD coil start to resonant, so that the capacitor voltage Vc 210 alternates and its amplitude drops quickly. The rectified voltage Vc2 keeps constant because the capacitor (C2) used in the rectified circuit is large. At the same time, the rectified voltage Vc1 306 starts reducing with the same rate of capacitor voltage (Cp) because the capacitor (C1) used in this rectified circuit is small. Since Vc1 is still higher than Vc2, the output Vp1 of the comparator (Comp 1) keeps low and the switch (S1) is turned off. Since the PWM pulse signal is high, its inverted signal Vp2 is low, which causes the switch (S2) to turn off. Since the two switches are both off, the constant current source (Iconstant) charges the capacitor (Cc) and the capacitor voltage (Vcp) increases. Since Vcp increases from 0V, Vcp is still lower than reference voltage (REF) and the output Vout of the comparator (Comp2) is kept low.

Between times T2 to T3, Vc1 keeps decreasing to 0 volts and Vc2 maintains a relatively constant value. The signal Vc1 becomes lower than Vc2 so that the output Vp1 of the comparator (Comp 1) switches to high and the switch (S1) is turned on. When the switch (S1) is on, the charge capacitor (Cc) is discharged and its voltage becomes 0. This is lower than REF so that the output of the comparator (Comp2) stays low (e.g., second state of detection signal).

At time T3, the PWM pulse signal is switched to low, then the power switch (Sp) is turned off and the resonant circuit (Cp and FOD coil) is cut off. The capacitor voltage (Vc) increases to high DC voltage. At the same time, the switch (S2) is on and the charge capacitor voltage (Vcp) stays at 0, which causes Vout to remain low. The circuit operation is the same as at T0 and one cycle is completed. Thus, when a foreign object is detected, the output does not generates a pulse for each cycle.

In various exemplary embodiments, the methods and apparatus for online foreign object detection disclosed herein have the following features and characteristics.
1. Separate FOD coil(s) are included to implement foreign object detection.
2. No extra power source is needed since the FOD coil is energized and the capacitor of the resonant circuit is charged by the magnetic field generated by the transmitter coil.
3. The capacitor charge circuit and FOD coil resonant circuit are multiplexed, which makes the implementation and use simple and novel.
4. Utilizes a novel quality factor detection circuit.

In various exemplary embodiments, the methods and apparatus for online foreign object detection disclosed herein have the following benefits and advantages over conventional solutions.
1. Simple circuit design.
2. Only analog circuitry needed, no need for microprocessor or software.
3. No extra power source needed.
4. High detection accuracy.
5. Online foreign object detection.
6. High speed foreign object detection.

Figure 6:
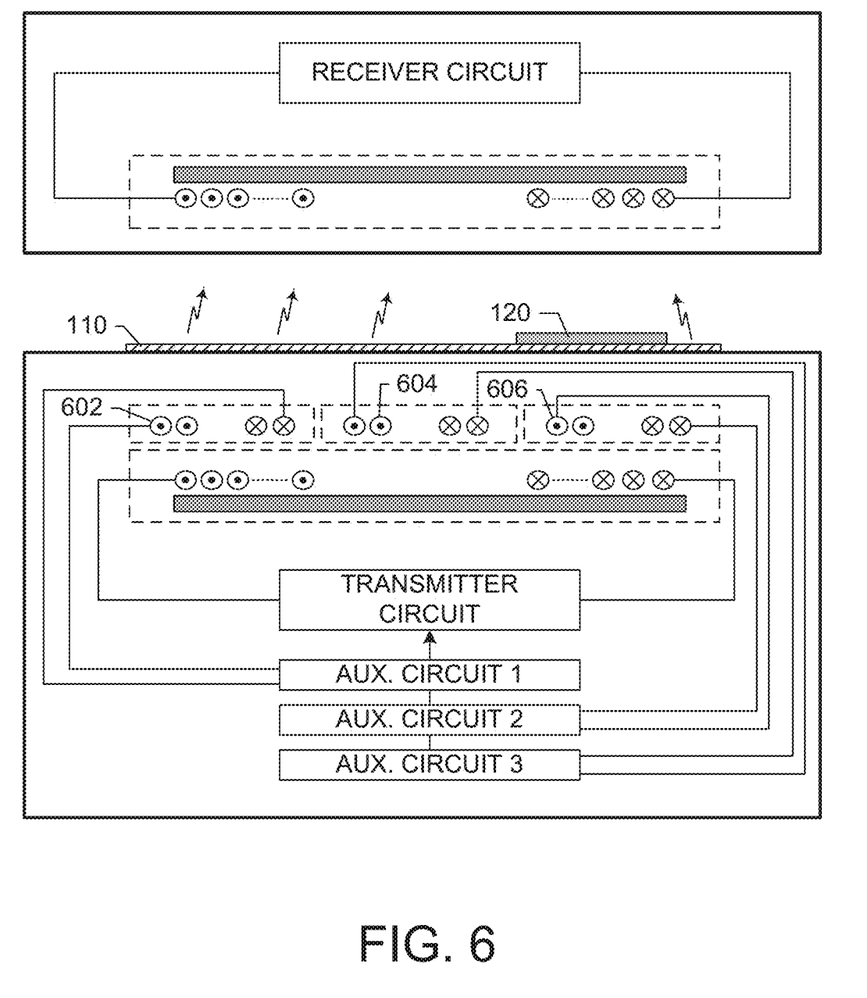
FIGS. 6-7 illustrate two foreign objection detection configurations that utilize multiple FOD coils for improved detection accuracy.
Figure 7:
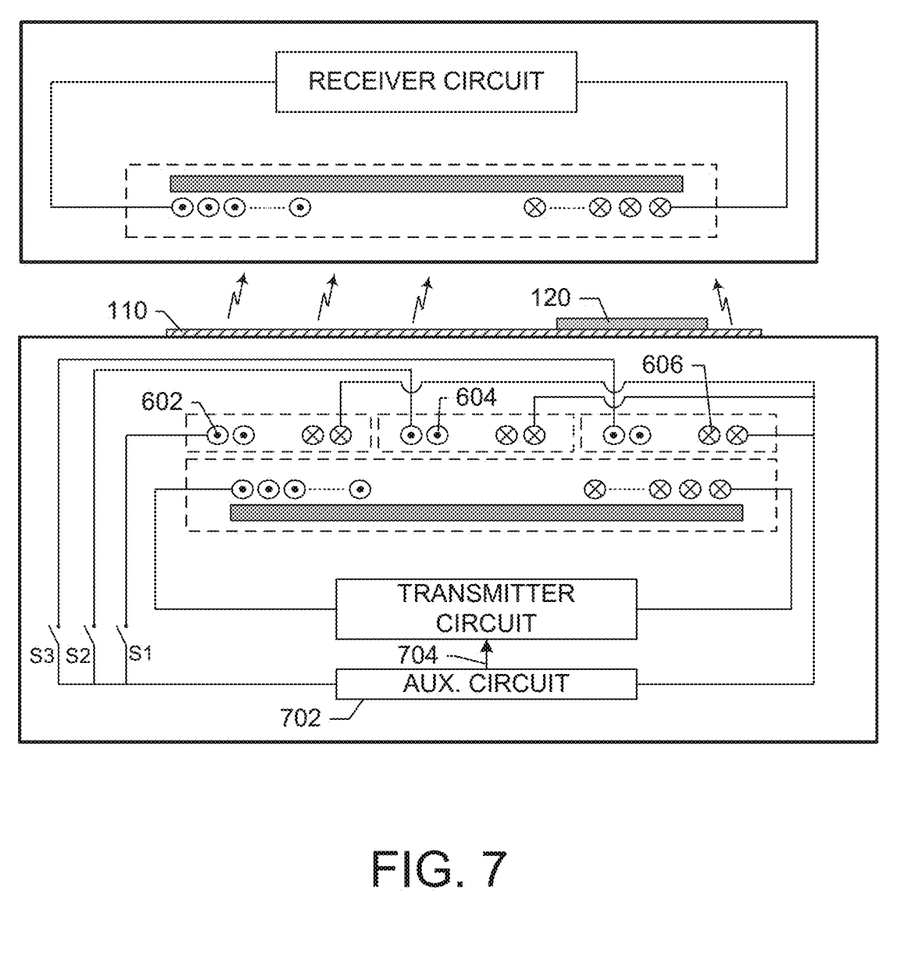

In various exemplary embodiments, multiple FOD coils can be utilized to improve the accuracy of foreign object detection. FIGS. 6-7 illustrates two foreign objection detection configurations that utilize multiple FOD coils for improved detection accuracy.

FIG. 6 shows an exemplary embodiment of a foreign object detector that includes three FOD coils and three auxiliary circuits. For example, the detector includes FOD coils 602, 604, and 606. Other similar concept with multiple (>1) FOD coils can also be used. In this embodiment, each coil is coupled to its own auxiliary circuit. During operation, the three coils are excited one by one. When coil 1 is excited with the PWM pulse signal, the foreign object in area 1 would be detected. The same conditions apply for coil 2 and coil 3. In FIG. 6 the output signal is sent to the transmitter circuit. This signal may be sent to the receiver circuit when the FOD coils are placed close to receiver coil, or the output signal may be used to warn the user of the wireless charging system directly.

FIG. 7 shows an exemplary embodiment of a foreign object detector that includes three FOD coils (602, 604, and 606) and one auxiliary circuit 702. In FIG. 7, only one auxiliary circuit is used, and multiple switches (S1-S3) are used to couple a selected coil to the auxiliary circuit 702. When S1 is turned on, FOD coil 602 is connected to the auxiliary circuit 702 and area 1 is checked by exciting FOD coil 1. When S2 is turned on, FOD coil 604 is connected to auxiliary circuit 702 and area 2 is checked. The same process is used for FOD coil 606. In FIG. 7, the output signal 704 is sent to the transmitter circuit. This signal may be sent to the receiver circuit when the FOD coils are placed close to receiver coil, or the output signal may be used to warn the user of the wireless charging system directly.

Figure 8:
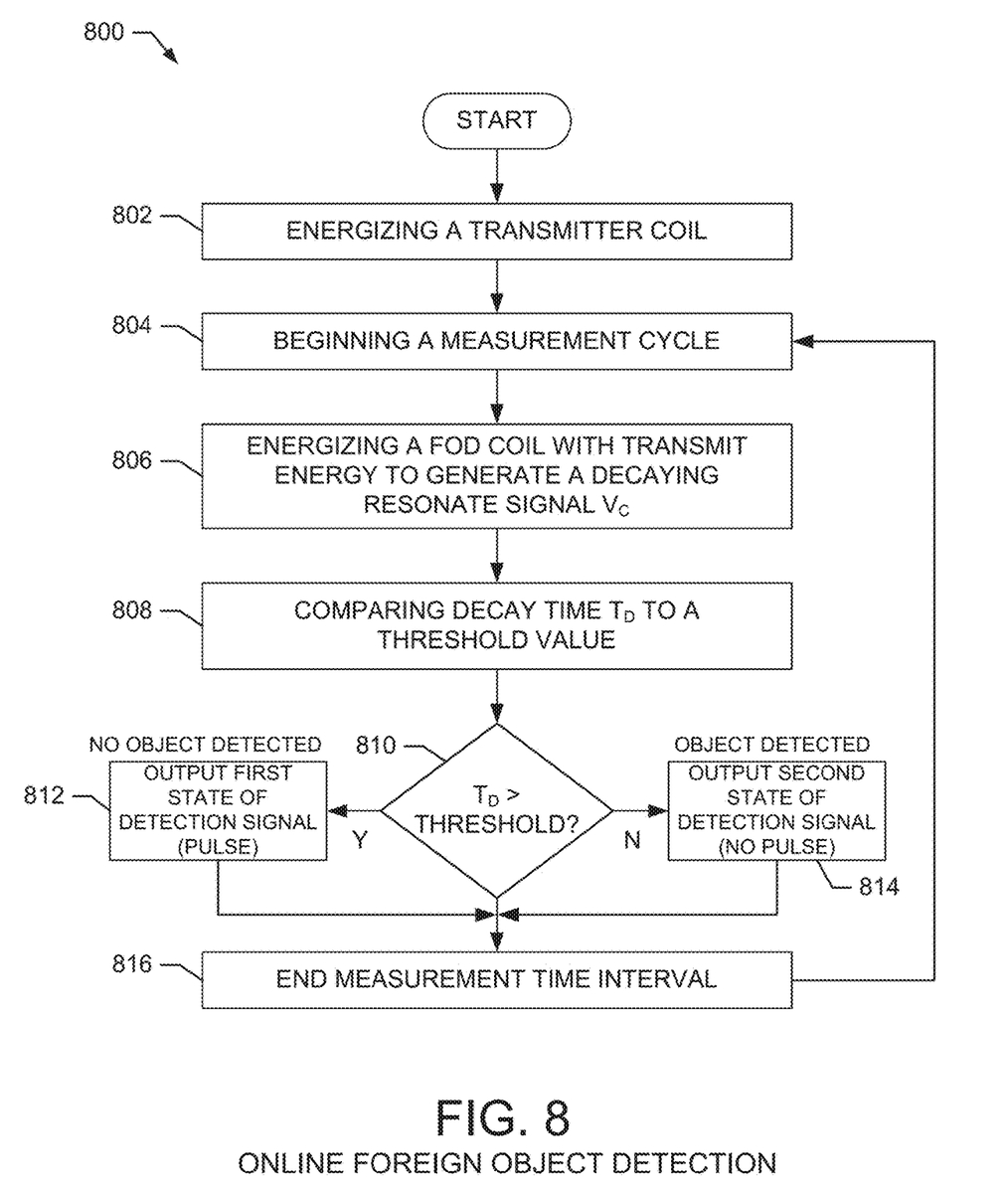
FIG. 8 shows an exemplary method for performing online foreign object detection in a wireless charging system in accordance with the invention.

FIG. 8 shows an exemplary method 800 for performing online foreign object detection in a wireless charging system in accordance with the invention. For example, the method 800 is suitable for use with embodiments of the foreign object detector described above.

At block 802, a transmitter coil in a wireless charging system is energized to transmit power to a receiving device. For example, the transmitter coil 102 is energized by the transmitter circuit 108 to transmit power to the receiving device 112.

At block 804, a measurement cycle is started. For example, the measurement cycle starts when the PWM pulse signal 212 goes to a high state as indicated at T1 in the timing diagrams shown in FIGS. 4-5. This is the beginning of a measurement time interval.

At block 806, a FOD coil is energized with transmit energy from the transmit coil and generates a decaying resonate signal Vc. For example, the FOD coil 122 is energized with energy from the field generated by the transmit coil 102 and generates the time-decaying resonate signal Vc 210 as shown in FIG. 3 and the timing diagrams in FIGS. 4-5.

At block 808, the decay time of the resonate signal Vc is compared to a threshold value. For example, the resonate signal Vc is rectified by the circuits 302 and 304 to generate the rectified signals Vc1 306 and Vc2 308, respectively. The signals Vc1 and Vc2 are compared by the comparator (Comp1) and the result Vp1 310 is used to control the switch S1. This comparison generates a time interval representative of the decay time $T_D$. During this time interval the capacitor Cc is allowed to charge to generate a voltage Vcp 208, which is representative of the quality factor of the FOD coil 124. Thus, the decay time of the signal Vc is used to generate the voltage Vcp 208 (e.g., quality factor) during the measurement interval. The timing diagrams in FIGS. 4-5 show how the decay time $T_D$ is measured by the signals Vc1 and Vc2 that are inputs to the comparator (Comp1).

At block 810, a determination is made as to whether the decay time $T_D$ is greater than a threshold value. If the decay time is not greater than the threshold value, the method proceeds to block 812. If the decay time is greater than the threshold value, the method proceeds to block 814. As illustrated in FIG. 3, the decay time is represented by the voltage Vcp 208. The threshold detector 210 comprises a comparator (Comp2) that compares the signal Vcp 208 to a reference voltage level (REF). The voltage level of REF represents a decay time threshold value. If the voltage Vcp is greater than REF, the comparator (Comp2) generates Vout having a high value. If the voltage Vcp is not greater than REF, the comparator (Comp2) generates Vout having a low value. FIGS. 4-5 further illustrate this operation. The timing diagrams of FIGS. 4-5 show the inputs (Vcp and REF) to the comparator (Comp2), and the generated output Vout. Notice that in FIG. 4, Vcp is greater than REF so that a pulse signal is generated on Vout to indicate no foreign object detected. In FIG. 5, Vcp is not greater than REF so that no signal is generated on Vout to indicate that an object has been detected.

At block 812, a first state of the detection signal is output when the decay time $T_D$ is greater than the threshold value. For example, a pulse on the detection signal is generated when Vcp is greater than REF as shown in FIG. 4, which indicates that no foreign object has been detected.

At block 814, a second state of the detection signal is output when the decay time $T_D$ is not greater than the threshold value. For example, no pulse on the detection signal is generated when Vcp is not greater than REF as shown in FIG. 5, which indicates that an object has been detected.

At block 816, the measurement time interval is ended. For example, the PWM pulse 212 goes to a low level that signifies the end of the measurement cycle and the start of the idle time interval. The method then proceeds to block 804 to start the next measurement cycle when the PWM pulse 212 goes high again.

Thus, the method 800 operates to perform online foreign object detection in a wireless charging system in accordance with the invention. It should be noted that the method 800 is illustrative and not limiting, and that that the operations of the method 800 may be rearranged, added to, deleted, or otherwise modified within the scope of the embodiments.

While particular embodiments of the present invention have been shown and described, it will be obvious to those skilled in the art that, based upon the teachings herein, changes and modifications may be made without departing from this exemplary embodiments of the present invention and its broader aspects. Therefore, the appended claims are intended to encompass within their scope all such changes and modifications as are within the true spirit and scope of this exemplary embodiments of the present invention.

What is claimed is:

1. An apparatus, comprising:
   a resonant circuit having a foreign object detection (FOD) coil that is energized by an online power transfer coil, and wherein the resonant circuit outputs a time-decaying resonate signal that indicates whether or not a foreign object is present;
   a determination circuit that determines a decay time from the time-decaying resonate signal; and
   a detector circuit that outputs a detection signal having a first state when the decay time is greater than a threshold value to indicate that a foreign object is not present, and outputs the detection signal having a second state when the decay time is not greater than the threshold value to indicate that a foreign object is present;
   wherein the determination circuit comprises first and second rectifiers that generate first and second rectified signals from the time-decaying resonant signal.

2. The apparatus of claim 1, further comprising a measurement cycle signal connected to the resonant circuit, wherein the measurement cycle signal defines a measurement time interval and an idle time interval, and wherein the time-decaying resonate signal is generated during the measurement time interval.

3. The apparatus of claim 2, wherein the resonant circuit comprises a capacitor coupled to the FOD coil.

4. The apparatus of claim 3, wherein the resonant circuit is configured to energize the FOD coil and charge the capacitor during the idle time interval, and generate the time-decaying resonate signal during the measurement time interval.

5. The apparatus of claim 4, wherein the resonant circuit comprises a switch that switches the resonant circuit between the measurement time interval and the idle time interval based on the measurement cycle signal.

6. The apparatus of claim 1, wherein the determination circuit comprises a comparator that compares the first and second rectified signals and generates a charging signal having a first charging state when the second rectified signal is greater than the first rectified signal and a second charging state when the first rectified signal is greater than the second rectified signal.

7. The apparatus of claim 6, wherein the determination circuit comprises a charging capacitor that charges to generate a quality factor voltage when the charging signal is in the first charging state.

8. The apparatus of claim 7, wherein the detector circuit comprises a comparator that compares the quality factor voltage to a reference voltage level to generate the detection signal.

9. The apparatus of claim 8, wherein the detector circuit generates the detection signal in the first state when the quality factor voltage is greater than the reference voltage level, and wherein the detector circuit generates the detection signal in the second state when the quality factor voltage is not greater than the reference voltage level.

10. The apparatus of claim 1, further comprising one or more additional resonant circuits having one or more additional foreign object detection (FOD) coils, respectively, that are energized by the online power transfer coil, wherein the one or more additional resonant circuits generate one or more additional time-decaying resonate signals, and wherein each additional time-decaying resonate signal indicates whether or not one or more foreign objects are present.

11. The apparatus of claim 10, further comprising
one or more additional determination circuits that determine one or more additional decay times from the one or more additional time-decaying resonate signals; and
one or more additional detector circuits that output at least one additional detection signal in the first state when the decay time is greater than a threshold value to indicate that an object is not present, and outputs the at least one additional detection signal in the second state when the decay time is not greater than the threshold value to indicate that an object is present.

12. The apparatus of claim 10, further comprising switches that selectively connect one of the one or more additional time-decaying resonate signals to the determination circuit to determine a selected decay time.

13. A method, comprising:
energizing a foreign object detection (FOD) coil with energy from an online power transfer coil to generate a time-decaying resonate signal (Vc);
converting a decay time $T_D$ of the resonate signal Vc to a voltage (Vcp);
comparing the voltage (Vcp) to a threshold value (REF);
outputting a detection signal having a first state when the voltage (Vcp) is greater than the threshold value (REF) to indicate that an object is not present;
outputting the detection signal having a second state when the voltage (Vcp) is not greater than the threshold value (REF) to indicate that an object is present;
generating first and second rectified signals from the time-decaying resonant signal;
generating a charging signal having a first charging state when the second rectified signal is greater than the first rectified signal and a second charging state when the first rectified signal is greater than the second rectified signal.

14. The method of claim 13, further comprising defining a measurement time interval and an idle time interval.

15. The method of claim 14, further comprising:
energizing the FOD coil during the idle time interval; and
generating the time-decaying resonate signal during the measurement time interval.

16. The method of claim 13, further comprising:
charging a capacitor to generate a quality factor voltage when the charging signal is in the first charging state; and
comparing the quality factor voltage to a reference voltage level to generate the detection signal.

17. The method of claim 13, further comprising energizing one or more additional foreign object detection (FOD) coils with energy from the online power transfer coil.

18. An apparatus, comprising:
a foreign object detection (FOD) coil that is energized by an online power transfer coil; and
an auxiliary circuit connected to the FOD coil, the auxiliary circuit generates a time-decaying resonate signal having a decay time and outputs a detection signal indicating that a foreign object is present when the decay time is not greater than a threshold value;
wherein the auxiliary circuit comprises first and second rectifiers that generate first and second rectified signals from the time-decaying resonant signal.

* * * * *